US011716364B2

(12) United States Patent
Kurien et al.

(10) Patent No.: US 11,716,364 B2
(45) Date of Patent: Aug. 1, 2023

(54) REDUCING BANDWIDTH REQUIREMENTS OF VIRTUAL COLLABORATION SESSIONS

(71) Applicant: INTERNATIONAL BUSINESS MACHINES CORPORATION, Armonk, NY (US)

(72) Inventors: Toby Kurien, Midrand (ZA); Richard Allen Young, Johannesburg (ZA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

(21) Appl. No.: 17/454,068

(22) Filed: Nov. 9, 2021

(65) Prior Publication Data
US 2023/0146818 A1 May 11, 2023

(51) Int. Cl.
*H04L 65/403* (2022.01)
*G06F 16/28* (2019.01)
(Continued)

(52) U.S. Cl.
CPC .......... *H04L 65/403* (2013.01); *G06F 16/285* (2019.01); *G06F 40/166* (2020.01);
(Continued)

(58) Field of Classification Search
CPC ... H04L 65/403; H04L 43/0894; H04L 43/16; G06F 16/285; G06F 40/166;
(Continued)

(56) References Cited
U.S. PATENT DOCUMENTS 8,027,276 B2   9/2011 Nierhaus
8,386,255 B2   2/2013 Michaelis
(Continued)

FOREIGN PATENT DOCUMENTS

WO   2017192851 A1   11/2017
WO   2018188936 A1   10/2018

OTHER PUBLICATIONS

Anonymous, "Automated Meeting Notes For In-Person and Remote Conversations," deepTalk-ai.com [online], [accessed on Jun. 17, 2021], 15 pages, Retrieved from the Internet: <URL: https://deeptalk-ai.com/>.
Anonymous, "Create eBooks & Leadmagnets to Reach More People," Designrr.io [online], [accessed on Aug. 12, 2021], 15 pages, Retrieved from the Internet: <URL: https://designrr.io/>.
(Continued)

*Primary Examiner* — Kristie D Shingles
(74) *Attorney, Agent, or Firm* — David Spalding

(57) ABSTRACT

A computer-implemented method, a computer system and a computer program product reduce bandwidth requirements of a virtual collaboration session. The method includes capturing session data from a virtual collaboration session. The session data is selected from a group consisting of video data, audio data, an image of a screen of a connected device and text data. The method also includes connecting to a live blog platform. The method further includes transmitting a text transcription of the virtual collaboration session to the live blog platform. The text transcription is generated by scanning the audio data using a speech-to-text algorithm. In addition, the method includes classifying a topic in the virtual collaboration session based on importance. Lastly, the method includes transmitting a multimedia file related to the topic to the live blog platform in response to the topic being classified as important. The multimedia file is extracted from the session data.

20 Claims, 5 Drawing Sheets

(51) Int. Cl.
*H04L 43/0894* (2022.01)
*H04L 43/16* (2022.01)
*G10L 17/14* (2013.01)
*G06F 40/289* (2020.01)
*G06F 40/166* (2020.01)
*G06F 40/30* (2020.01)
*G06V 20/40* (2022.01)

(52) U.S. Cl.
CPC ............ *G06F 40/289* (2020.01); *G06F 40/30* (2020.01); *G06V 20/41* (2022.01); *G06V 20/46* (2022.01); *G10L 17/14* (2013.01); *H04L 43/0894* (2013.01); *H04L 43/16* (2013.01)

(58) Field of Classification Search
CPC ....... G06F 40/289; G06F 40/30; G06V 20/41; G06V 20/46; G10L 17/14
See application file for complete search history.

(56) References Cited

U.S. PATENT DOCUMENTS

| | | | |
|---|---|---|---|
| 10,188,943 | B1 | 1/2019 | Schwartz |
| 2017/0123492 | A1* | 5/2017 | Marggraff ............ H04L 63/0861 |
| 2018/0233028 | A1* | 8/2018 | Rhoads ................ H04N 23/611 |
| 2019/0041842 | A1* | 2/2019 | Celia .................. G05B 23/0291 |

OTHER PUBLICATIONS

Author Unknown, "Video AI," Google Cloud, Accessed: Aug. 17, 2021, https://cloud.google.com/video-intelligence/, 8 pages.

Jahgirdar, et al., "Extract insights from videos," IBM Developer [online], Jul. 20, 2020 [accessed on Jun. 17, 2021], 6 pages, IBM, Retrieved from the Internet: <URL: https://developer.ibm.com/technologies/artificial-intelligence/patterns/extract-textual-insights-from-a-given-video/>.

Kamperman, "Computer Vision: Frame differencing," Blog, Apr. 24, 2010, https://www.kasperkamperman.com/blog/computer-vision/computervision-framedifferencing/, 6 pages.

Mell et al., "The NIST Definition of Cloud Computing", National Institute of Standards and Technology, Special Publication 800-145, Sep. 2011, 7 pages.

Xu, et al., "Content Extraction from Lecture Video via Speaker Action Classification based on Pose Information," 2019 International Conference on Document Analysis and Recognition, Sep. 20-25, 2019, pp. 1047-1054, IEEE, Sydney, NSW, AU, DOI: 10.1109/ICDAR.2019.00171, Retrieved from the Internet: <URL: https://ieeexplore.ieee.org/document/8978123>.

Otter, "Tired of Disorganized Meeting Notes?", Otter.ai, [accessed Feb. 3, 2023], 5 pgs., Retrieved from the Internet <https://otter.ai/>.

Veed, "Anyone Can Make a Great Video. That Means You.", Veed.io, [accessed Feb. 3, 2023], 14 pgs., Retrieved from the Internet: <https://www.veed.io/>.

* cited by examiner

REDUCING BANDWIDTH REQUIREMENTS OF VIRTUAL COLLABORATION SESSIONS

BACKGROUND

Embodiments relate generally to virtual collaboration sessions, and more specifically, to reducing the bandwidth requirements for those participants in virtual collaboration sessions that may have resource restrictions.

In a world transitioning to professional and classroom environments, as well as personal settings, that are more geographically diverse, collaboration with others in these settings may become more dependent on using videotelephony services that utilize the Internet. Videotelephony may enable the reception and transmission of audio-video signals by users in different locations, thereby providing a means to communicate video and voice between people in real time. Each participant in a virtual collaboration session may communicate a video image of themselves along with audio of their voice using a computing device such as a smart phone, tablet computing device, or personal computer, among other devices. Each participant attending a virtual meeting may participate from any location, including from an office or a home, among other locations. For homes or other environments that may have challenges with the bandwidth needed to fully access these sessions, so-called "live blogging" by some participants that may be seen by other participants may become popular to allow those participants to fully engage in the session.

SUMMARY

An embodiment is directed to a computer-implemented method for reducing bandwidth requirements of a virtual collaboration session. The method may include capturing session data from a virtual collaboration session. In this embodiment, the session data is selected from a group consisting of video data, audio data, text data and an image of a screen of a connected device. The method may also include connecting to a live blog platform. The method may further include transmitting a text transcription of the virtual collaboration session to the live blog platform. In this embodiment, the text transcription is generated by scanning the audio data of the virtual collaboration session using a speech-to-text algorithm. In addition, the method may include classifying a topic in the virtual collaboration session based on importance. Lastly, the method may include transmitting a multimedia file related to the topic to the live blog platform in response to the topic being classified as important. In this embodiment, the multimedia file is extracted from the session data.

In another embodiment, the method may include transmitting the text messages to the virtual collaboration session in response to receiving text messages from the live blog platform.

In a further embodiment, classifying the topic may include scanning the text transcription being transmitted to the live blog platform using a natural language processing algorithm. The method may also include classifying the topic as important in response to detecting specific phrases in the text transcription.

In yet another embodiment, classifying the topic may include extracting a video frame from the session data. The method may also include scanning the video frame using an object recognition algorithm. Lastly, the method may include classifying the topic as important in response to detecting specific objects in the video frame.

In an embodiment, transmitting the multimedia file related to the topic to the live blog platform may include determining a connection speed to the live blog platform and transmitting the multimedia file in response to the connection speed being above a threshold.

In another embodiment, transmitting the multimedia file related to the topic to the live blog platform may include determining a difference between the multimedia file extracted from the session data and files transmitted at a prior time by comparing the multimedia file to the files and transmitting the multimedia file in response to a difference above a threshold.

In yet another embodiment, generating the text transcription of the virtual collaboration session may include scanning the audio data of the virtual collaboration session with an automatic voice recognition algorithm. In this embodiment, the audio data includes a plurality of utterances. The method may also include identifying a speaker for each utterance and associating the speaker with the utterance. Lastly, the method may include removing the associated utterance from the text transcription of the virtual collaboration session in response to identifying a specific speaker.

In addition to a computer-implemented method, additional embodiments are directed to a system and a computer program product for dynamically identifying a shared document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
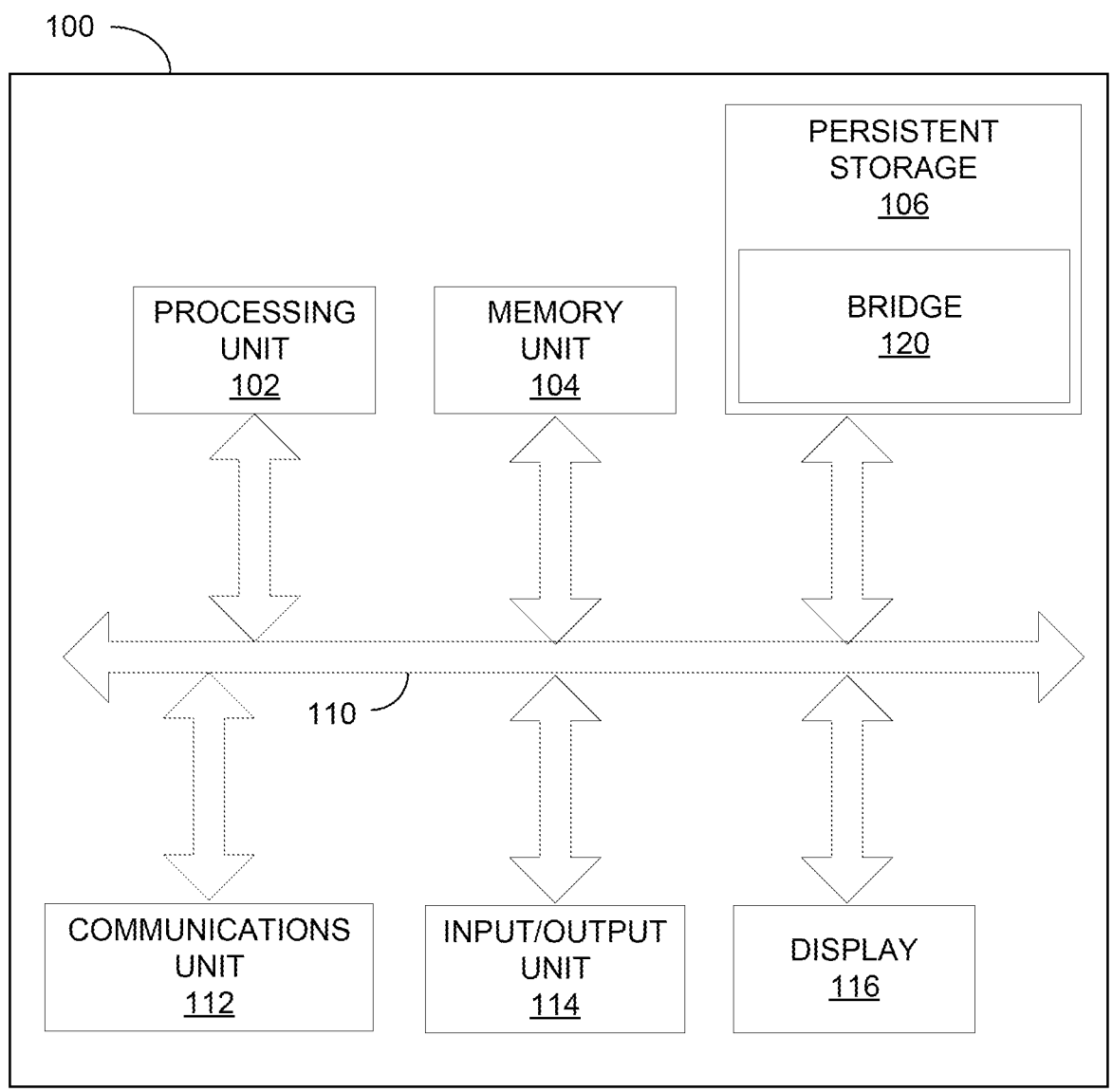
FIG. 1 depicts a block diagram of internal and external components of the computers and servers depicted in FIG. 2, according to at least one embodiment.

As remote work and global collaboration grow, the use of virtual collaboration tools over the Internet may become more prevalent. During a virtual collaboration session, a presenter may share the screen of their computing device and display a presentation that they have created with important items or topics that may be represented by various tables or graphs. In a classroom setting, the presenter or teacher may stand in front of a classroom and write on a surface that may have Internet functionality, e.g., a smart board, or on a more traditional surface such as a whiteboard. In such a scenario, students who may be connected via the Internet and their mobile device, e.g., smartphone or tablet, may be able to listen to the presentation and interact with the presenter to have a conversation or take notes. The students in this scenario may experience an educational environment that resembles an in-person learning environment as much as possible.

However, with the proliferation of remote work and remote learning in many households, the demands on computing resources and communication bandwidth may be severe. In many areas that are less developed than major urban centers, the cost of Internet service may be high, or the available devices may have limited capability with respect to computing resources such as processor speed or memory or available storage, among other things. As a result, the bandwidth demands to accommodate every family member's situation may be severe, as each parent may need to connect to satisfy a work obligation or attend some other online function and one or more children may need to connect to a classroom for school. The combined bandwidth may tax what is available in the home, which may have its own constraints based on cost or availability. As a result, there is a need to reduce this demand and it may be advantageous to provide a method that automatically filters the content that reaches a user and their mobile device. Such a method may improve the experience of an end user that may have trouble staying connected to a virtual collaboration session and thus may improve their personal or professional productivity. If the method were built into software applications that provide a virtual collaboration experience, the technical capability of such a software application may also be improved.

One technique that may be useful as a solution to the high resource requirements of a virtual collaboration session that would not necessarily affect adversely the quality of the session may be "live blogging". In a traditional use of live blogging in a large event setting, a person, e.g., a journalist or writer under the auspices of a media entity, may attend a conference or event, e.g., a technology conferences or a product launch event or a popular sporting event, and act as a proxy for the public that is not able to attend themselves. The person may participate in the conference or event like any other attendee but, in addition to that role, may also open a chat window that is connected to an Internet site that is generally available to a large amount of people who would like to follow the conference or event but cannot attend live. The live attendee may then type out and describe what is happening in real-time and the online audience may interact with the live attendee. In addition to the text descriptions, the live attendee may also selectively insert images or photos into the chat window, or perhaps short audio or video clips, to enhance the experience for those that cannot attend live. The use of text and only intermittent use of multimedia such as audio or video may greatly reduce the bandwidth and computing requirements for those users that cannot attend live, while closely simulating as best as possible the experience of attending the actual conference or event.

To leverage this live blogging technique, an artificial intelligence (AI) agent may be granted access by a presenter or host of a virtual collaboration session to connect to the session and create a two-way bridge between the presenter, e.g., in a classroom, and students through their mobile devices. In this scenario, students would then be able to attend the classroom directly over the Internet if they had sufficient bandwidth and computing resources, or though a less resource-intensive application such as an instant messaging or live blogging app, i.e., software applications that allow real-time chronological display of text messages, images, and short audio or video clips. This bridging concept may allow students who connect through the instant messaging or live blogging app to follow the spoken presentation through text that may be transcribed and displayed in the chat window of the app using automatic speech recognition and speech-to-text algorithms. In addition, the users connected to the instant messaging or live blog app may see important details via embedded images, voice notes, and video clips that the AI agent may provide by determining key items or topics and inserting additional content only for those items or topics. It is important to note, however, that the text transcription may not be a complete transfer of any spoken words in the virtual collaboration session. For instance, there may be cross talk in the room or some other audible interruption that may be filtered out of the transcription before passing to the live blogging platform. It is not required that the transcription be complete and verbatim, only that it passes an accurate understanding of the virtual collaboration session to participants that may be connected to the live blog platform instead of directly to the session.

In addition to the content that may flow from the presenter to the users, instant messaging or live blog users may also interact by sending text messages, voice notes, images, or video clips back to the presenter via the instant messaging or live blog app and forwarded by the AI agent in order to ask questions or demonstrate their understanding. In this scenario, because the AI agent may act as a normal participant in a virtual collaboration, these activities may occur without the presenter needing to change anything in how the virtual collaboration session is conducted. The live blogging would be completely handled by the AI agent as a proxy for the remote users, exactly like the person in the above example.

Figure 2:
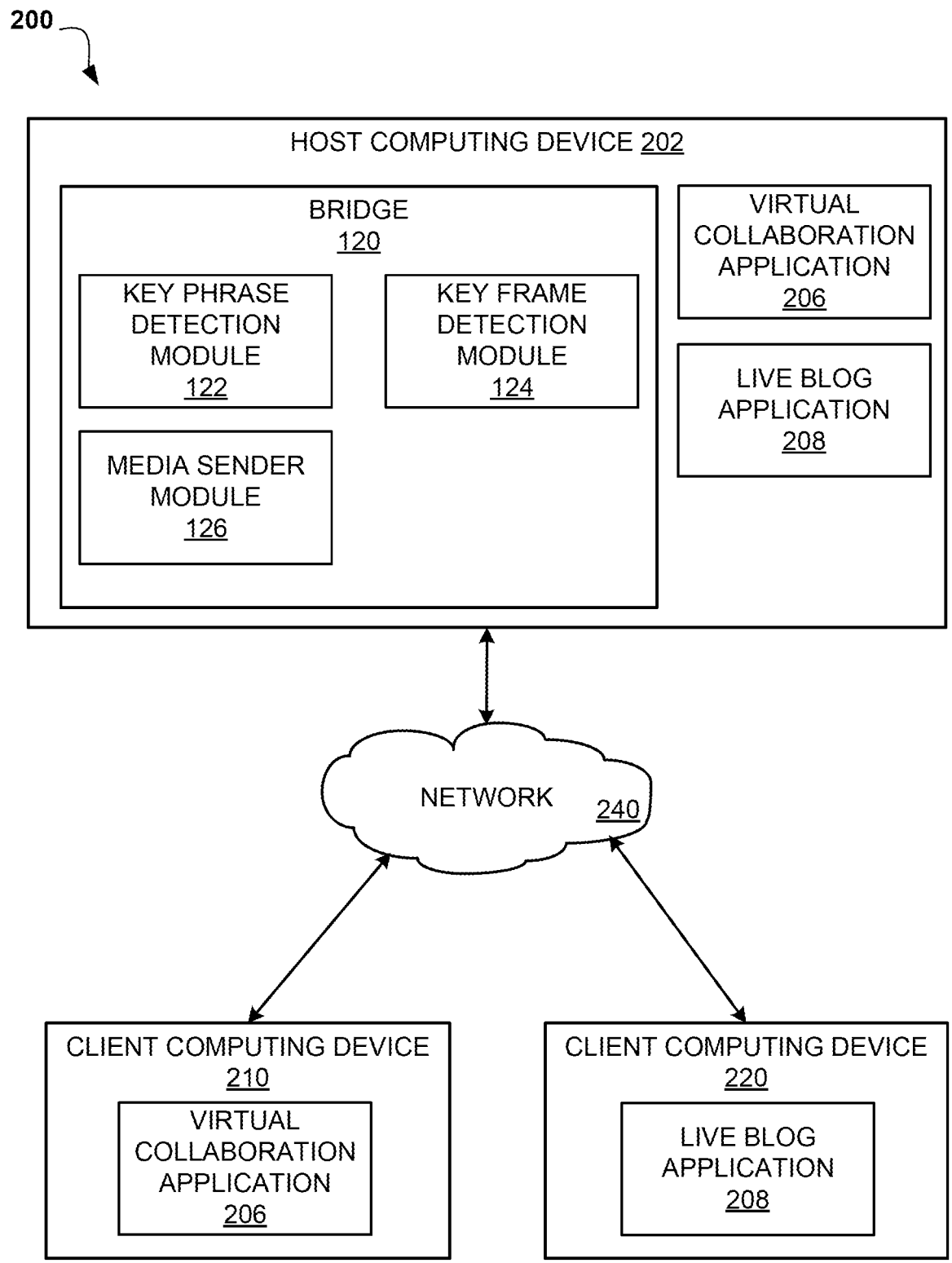
FIG. 2 depicts a block diagram of a computing environment that may be used for bridging a live blog platform with a virtual collaboration session, according to an exemplary embodiment.

Referring to FIG. 1, a block diagram is depicted illustrating a computer system 100 which may be embedded in the host computing device 202 or client computing device 210 or client computing device 220 depicted in FIG. 2 in accordance with an embodiment. It should be appreciated that FIG. 1 provides only an illustration of one implementation and does not imply any limitations with regard to the environments in which different embodiments may be implemented. Many modifications to the depicted environments may be made based on design and implementation requirements.

As shown, a computer system 100 may include a processor unit 102, a memory unit 104, a persistent storage 106, a communications unit 112, an input/output unit 114, a display 116, and a system bus 110. Computer programs such as bridge 120 may be typically stored in the persistent storage 106 until they are needed for execution, at which time the programs may be brought into the memory unit 104 so that they can be directly accessed by the processor unit 102. The processor unit 102 may select a part of memory unit 104 to read and/or write by using an address that the processor unit 102 may give to the memory unit 104 along with a request to read and/or write. Usually, the reading and interpretation of an encoded instruction at an address may cause the processor unit 102 to fetch a subsequent instruction, either at a subsequent address or some other address. The processor unit 102, memory unit 104, persistent storage 106, communications unit 112, input/output unit 114, and display 116 may interface with each other through the system bus 110.

Examples of computing systems, environments, and/or configurations that may be represented by the data processing system 100 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Each computing system 100 may also include a communications unit 112 such as TCP/IP adapter cards, wireless Wi-Fi interface cards, or 3G or 4G wireless interface cards or other wired or wireless communication links. The bridge 120 in a host computing device 202, along with the virtual collaboration application 206 in the host computing device 202 or client computing device 210 and further, the live blog application 208 in client computing device 220, may communicate with external computers via a network (for example, the Internet, a local area network or other wide area network) and respective network adapters or interfaces, e.g., communications units 112. From the network adapters or interfaces, the bridge 120 may be loaded into the respective persistent storage 106.

Referring to FIG. 2, a block diagram of an environment for conducting a virtual collaboration session is depicted, according to at least one embodiment. The overall networked computer environment 200 may include a host computing device 202 and one or more client computing devices, interconnected via a communication network 240. According to at least one implementation, the networked computer environment 200 may include a plurality of client computing devices, of which only two are shown for illustrative brevity. It should also be noted that the client computing devices differ only in the specific application that is loaded and running to connect to the virtual collaboration session, which is intended to illustrate that in the configuration shown in FIG. 2, the clients may be separated into two logical subgroups that use the same network, e.g., the Internet, to connect to one another. One logical subgroup is represented by the virtual collaboration application 206, which is shown loaded and running on host computing device 202 and client computing device 210, in which a virtual collaboration session may be conducted as normally understood, that is a host, e.g., host computing device 202, having overall control over the session, including which participants may connect to the session, but any of the devices in the session may contribute to the virtual meeting session, including sharing their computer screen or participating in a chat session or any other features that may be provided in the virtual collaboration session. While any user that desires to connect to the virtual collaboration session may do so, users may also opt to connect to the virtual collaboration session via the bridge 120 and as a member of the second logical subgroup. In the second logical subgroup, which is represented by the live blog application 208 shown loaded and running on the host computing device 202 and also client computing device 220, connection to the virtual collaboration session may be achieved through the same network 240, but in this case, client computing device 220 connects to the live blog application 208 instead of using virtual collaboration application 206. As an example, client computing device 220 may open an instant messaging application or a live blog application instead of a virtual collaboration application 206 that may be directly connected to the virtual collaboration session.

The host computing device 202 or client computing device 210 or client computing device 220 may be a mobile device, telephone, personal digital assistant (PDA), laptop computer, netbook computer, tablet computer, personal computer (PC), a desktop computer, or any programmable electronic device or any network of programmable electronic devices capable of hosting and running the virtual collaboration application 206 or live blog application 208. As discussed with reference to FIG. 1, host computing device 202, client computing device 210 and client computing device 220 may include computing system 100.

The communication network 240 may include various types of communication networks, such as a wide area network (WAN), local area network (LAN), a telecommunication network, a wireless network, a public switched network and/or a satellite network. The communication network 240 may include connections, such as wire, wireless communication links, or fiber optic cables. The network 240 may also include additional hardware not shown such as routers, firewalls, switches, gateway computers and/or edge servers. It may be appreciated that FIG. 2 provides only an illustration of one implementation and does not imply any limitations with regard to the environments in which different embodiments may be implemented. Many modifications to the depicted environments may be made based on design and implementation requirements. Accordingly, the communication network 240 may represent any communication pathway between the various components of the networked computer environment 200.

In the example of FIG. 2, a virtual collaboration session may already exist or may be initiated by the host computing device, at which point the bridge 120 may connect to the session as a regular participant. It is important to note that while the bridge 120 is shown in FIG. 2 as being loaded and running on the host computing device 202, this is not a requirement. One of ordinary skill in the art may recognize that the bridge 120 may be loaded and running in the cloud and provided to the computers within the networked computing environment 200 as a service to users that may wish to connect to a virtual collaboration session using fewer computing or bandwidth resources. In addition, the bridge 120 may be loaded and running on a client computing device 210 or client computing device 220 or another computer not shown.

The bridge 120 and its modules may operate in tandem with virtual collaboration application 206 on the host computing device 202 in the configuration shown in FIG. 2. The bridge 120 and its modules may be discrete software that is separately loaded into the computing device or may be embedded within an application running the virtual collaboration session at the computing device. It will be appreciated by one of ordinary skill in the art that while modules operate at a computing device, it is not required that the software is physically loaded or installed on the hardware but may be on a server for the virtual collaboration session. The virtual collaboration session may be fully in the cloud and hosted by a server that is not shown.

In the example of FIG. 2, the bridge 120 may capture the audio and video elements of the virtual collaboration session using an appropriate device and may store a predetermined amount of video frames in a buffer for potential transmission on-demand to its connected client computing devices. Similarly, an audio buffer may be used to store a predetermined amount of the speaker's audio. The bridge 120 may utilize a voice transcriber in addition to storing the audio itself, which may use an automatic speech recognition algorithm to identify the speaker and use speech-to-text to convert the spoken words to text data that may be understood by the bridge 120. Either the audio itself or the text data produced by the transcriber may be broadcast to client computing devices by the bridge 120.

The bridge 120 may include a key phrase detection module 122 that may analyze the voice transcription from the virtual collaboration session using speech recognition and natural language processing algorithms to detect key phrases that may trigger the transmission of multimedia from the presentation in the virtual collaboration session, e.g., an audio clip or a video clip from the respective buffers, or an image taken from the video, as will be described further below.

The bridge 120 may also include a key frame detection module 124 that may analyze the video from the virtual collaboration session using object recognition or other computer vision techniques, which may include supervised machine learning models, to determine when transmission of multimedia from the presentation, e.g., an audio clip or a video clip from the respective buffers, or an image taken from the video, may be appropriate.

Whether the trigger comes from the key phrase detection module 122, and thus through the audio transcription of the virtual collaboration session, or from the key frame detection module 124, and thus the video or images of the virtual collaboration session, the bridge 120 may transmit multimedia, as described above, of the virtual collaboration session to those client computing devices that connect to the live blog environment, e.g., client computing device 220, using the media sender module 126.

The host computing device 202 may communicate with the client computing device 210, as well as the client computing device 220 that connect to the live blog platform, via the communication network 240, in accordance with embodiments of the invention. As will be discussed with reference to FIGS. 4 and 5, the virtual collaboration session running on the host computing device 202 and client computing device 210, and in addition the live blog environment running on the host computing device 202 and client computing device 220, may also operate in a cloud computing service model, such as Software as a Service (SaaS), Platform as a Service (PaaS), or Infrastructure as a Service (IaaS). The servers running the virtual collaboration session on the participating devices may also be located in a cloud computing deployment model, such as a private cloud, community cloud, public cloud, or hybrid cloud.

Figure 3:
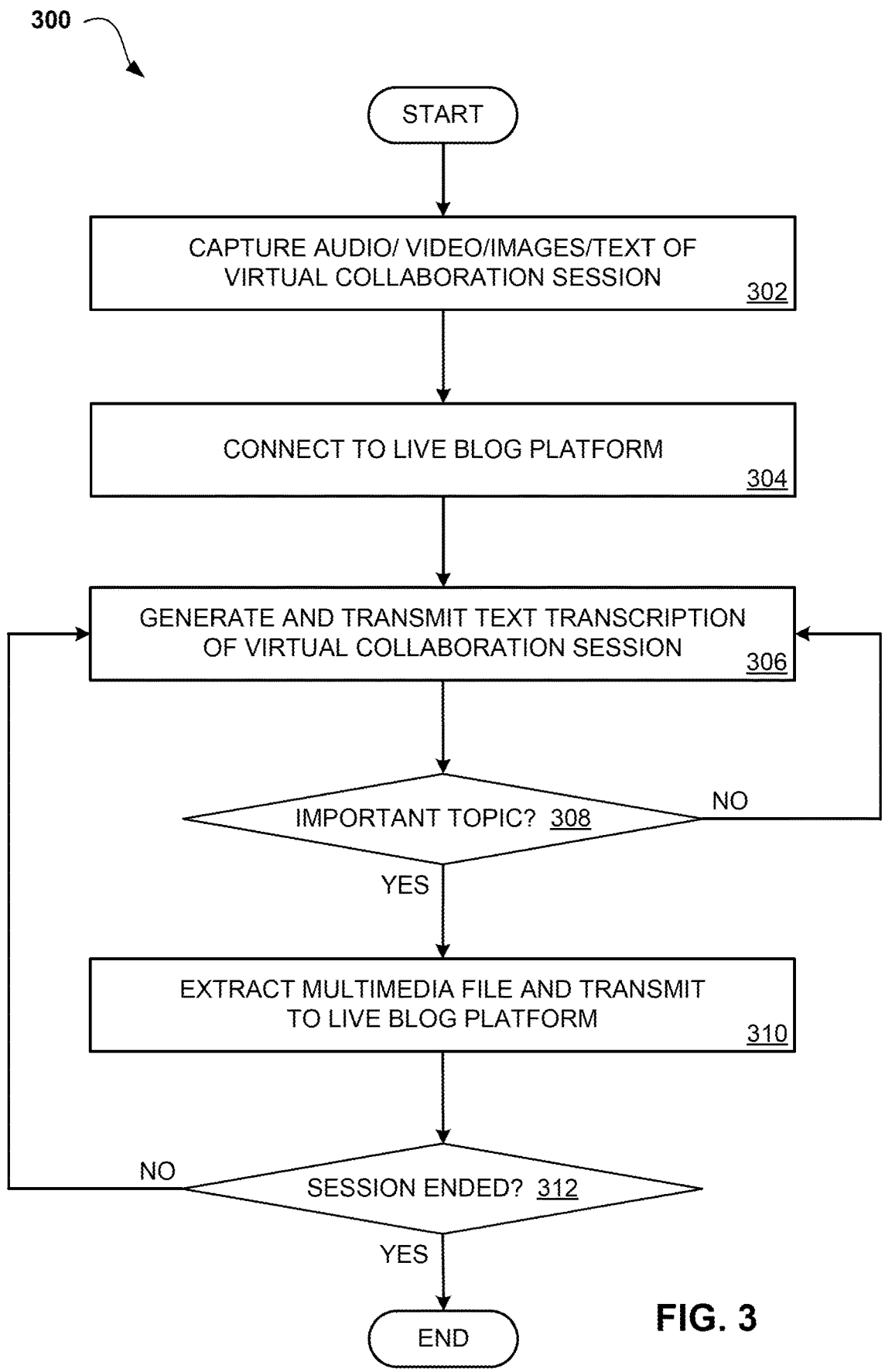
FIG. 3 depicts a flow chart diagram of a process to reduce bandwidth requirements of virtual collaboration sessions in accordance with one or more embodiments.

Referring to FIG. 3, an operational flowchart illustrating a process 300 to is depicted according to at least one embodiment. At 302, an agent, e.g., bridge 120, may connect as a participant to a virtual collaboration session and capture virtual collaboration session data. Examples of the session data include audio data captured by a microphone of any speakers in the session or video data gathered with a camera in a classroom or other setting if a presenter is using a whiteboard or other method of handwriting notes. If an electronic presentation is available, then the agent may extract images of the presentation from a device connected to the presentation, e.g., the screen of the presenter's computing device. A virtual collaboration session may be any forum that connects one or more participants to each other in a collaborative way, such that topics may be discussed, and audio and video may be transmitted to and received by all participants, along with the other potential tools described herein.

It is important to note that any real-time monitoring of a virtual meeting session as mentioned herein requires the informed consent of all those people whose audio, video and text conversations are captured for analysis. Consent may be obtained in real time or through a prior waiver or other process that informs a subject that their voice may be captured by a microphone or image captured by a camera or other sensitive personal data may be gathered through any means and that this data may be analyzed by any of the many algorithms, including natural language processing, that are mentioned below. A user may opt out of any portion of the real-time monitoring at any time.

At 304, the agent, e.g., bridge 120, may connect to a live blog platform. As described above, the live blog platform may include an instant messaging application or a live blogging application or any application that may provide a text window and also file attachments. It is not required that the agent connect to a specific platform or type of application, the agent may use any online vehicle to allow users to connect as an alternative to joining the virtual collaboration session directly. It is only required that the platform be able to accept text messages, e.g., the text transcription described in 306, and also multimedia files as described both in the example of FIG. 2 and in the process below. In addition to allowing the bridge 120 to transmit a text transcription and multimedia files from the virtual collaboration session, the bridge 120 may monitor the live blog environment and users that connect using client computing device 220 and live blog application 208 may send text messages to the bridge 120 via live blog application 208 and those text messages may be sent to the virtual collaboration session and viewed by the participants in the session. As an example, a student may be using a mobile device and connecting to the virtual collaboration session through the live blog application 208 and bridge 120. The student may enter a text question into the chat feature of the live blog environment and the bridge 120 may forward the text question to the presenter, where they may read the text and reply as appropriate.

At 306, a text transcription of the virtual collaboration session may be generated and transmitted to the live blog platform. The text transcription may be created by scanning the audio data within the virtual collaboration session using an appropriate speech-to-text algorithm. Optionally, the raw voice data may be broken into a series of utterances and the speaker of each utterance may be identified using automatic voice recognition. The utterances may then be classified according to the speaker by associating the utterances with the speaker. This process would allow for the agent to selectively include or exclude utterances based on the associated speaker, which may be useful in reducing the overall bandwidth requirements that may be needed for the session. For instance, in a classroom lecture setting, it may be useful to only include transcription of the audio for the teacher who is presenting the lecture. Any cross talk that may be picked up, or comments from the audience, may be filtered out so that the live blog environment does not receive the added text. Whether or not the additional step of identifying a speaker and filtering the audio is performed, the resulting text transcription may be sent via the bridge 120 to the live blog platform over the network, as shown using the example of FIG. 2.

At 308, topics in the virtual collaboration session may be identified or classified as important. This may be done using the key phrase detection module 122 or the key frame detection module 124, as mentioned above with respect to FIG. 2. As an example of the key phrase detection module 122, the presenter may speak the words "send video" or "send audio", or some other default predetermined command phrase, to manually trigger the bridge 120 to send multimedia to the live blog. In addition, the key phrases may be configured in a profile that is specific to a presenter or they may be manually entered by the presenter before the virtual collaboration session begins. Alternatively, the key phrase detection module 122 may listen to the spoken audio from the presenter and determine an intent or meaning in the words to trigger the broadcast of multimedia clips. For example, if the presenter speaks the phrase "This is pronounced . . . ," it may be determined that an audio clip should be transmitted to the devices connected to the live blog environment, while the phrase "Here is a demonstration . . . " from the presenter might trigger a video clip to be sent to the live blog.

In a further example using the key frame detection module 124, it may be determined with object recognition that a hand is present in the frame for an extended period of time near a whiteboard, which the module also may recognize, in a manner that suggests that the presenter is writing on the whiteboard. Once the hand is removed from the frame, this may be an indication that an image of the whiteboard should be captured and sent by the bridge 120 to the users connected to the live blog. Another example may use screen images that may be presented within the virtual collaboration session. If a presentation is shared among the participants of the virtual collaboration session, an algorithm may be used to detect if the image has changed, indicating a new slide of the presentation, or character recognition may be used on the image to determine if there are any key words or phrases on the screen that may indicate an important item or topic that may require a copy of the image or a clip of the speaker's audio to be transmitted to the live blog via the bridge 120. In another embodiment, a gesture or other movement of the presenter in the video of the virtual collaboration session may be detected as an indication to send multimedia to the live blog via the bridge 120. For example, the presenter may make a first to indicate that video should be transmitted. As with the key phrases above, there may be default gestures that correspond to certain actions or these gestures may be manually set by a presenter in a profile and, in either case, may be changed at any time.

In addition to the examples cited above with respect to the key phrase and key frame detection modules in the context of FIG. 2, a chatbot API, such as IBM Watson™ Conversations API, may be used to return a predicted "intent", each representing one of the three media types (images, audio and video). The chatbot may be trained with specific example phrases that the chatbot may learn to recognize. For example, for the "image" intent, "send image," "take photo," "this slide shows . . . ," "if you look at the . . . ," etc. could be training data. Also, for the "audio" intent, "send audio," "The way to pronounce . . . ," "Listen to this . . . ," etc. may be the training phrases. Lastly, for the "video" intent, "send video," "here is a video . . . ," "let me show you . . . ," etc. may be the training phases. In this model, the chatbot API may return the intent represented by the phrase that it may detect in the text transcription, such that if the model returns "video," then that topic may be classified as important but also that a video clip should be sent. In additional embodiments, this model may also detect additional words in the command, such as a duration or time, e.g., "send 30 second video" may extract a video clip of 30 seconds duration.

In this embodiment, the topic may be classified according to importance using a machine learning classification model. One or more of the following machine learning algorithms may be used to classify the events: logistic regression, naive Bayes, support vector machines, artificial neural networks and random forests. In an embodiment, an ensemble learning technique may be employed that uses multiple machine learning algorithms together to assure better prediction when compared with the prediction of a single machine learning algorithm. The results of the determination of importance may be stored with the embedded graphic as associated metadata.

At 310, as discussed with respect to the media sender module 126 in FIG. 2, a multimedia file may be generated and transmitted by the bridge 120. Because of the underlying desire to save bandwidth in using the live blog environment, the video and audio may be preserved in buffers that are limited in size and, therefore, the time that may elapse between the received trigger and actual transmission of the clip or image may be limited. The buffers may be configured in length, for instance, "only save 10 minutes or audio or video" for transmission to the devices connected in the live blog environment. In addition, in determining when to send multimedia to the connected live blog clients, there may be a rate limiting function applied by the media sender module 126 such that multimedia of the virtual collaboration session cannot be sent too frequently, thus preserving bandwidth. This rate limiting function may also keep a memory of images sent by the bridge 120 and determine, using any of the computer vision techniques described above, if there is a sufficient difference between the current image and the prior image. If there is not a sufficient difference, transmission of multimedia may be canceled by this function. As another example, the connection speed, i.e., the available bandwidth, may be measured by the bridge 120 and transmission of multimedia may be restricted as long as the speed available is not above a predetermined threshold. The threshold may be predetermined and dynamically adjusted as needed. Such a threshold may be used for each specific user that may be connected to the bridge or may be a general threshold for all users connected to the virtual collaboration session through the bridge. The threshold may also be manually adjusted as a setting at any time at the user's discretion.

At 312, after a multimedia file has been sent, it may be determined whether the virtual collaboration session is still active and has users still connected. If the session has ended, then the bridge 120 may disconnect from the session and the live blog platform that has been set up with the live blog application 208 and may alert the live blog platform, and therefore those users that connected to the session through the live blog application 208, that the session has ended. However, an alert may not be required, and users may disconnect separately. If the session has not ended, then the process may move back to step 306 and the text transcription of the virtual collaboration session may continue as before.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
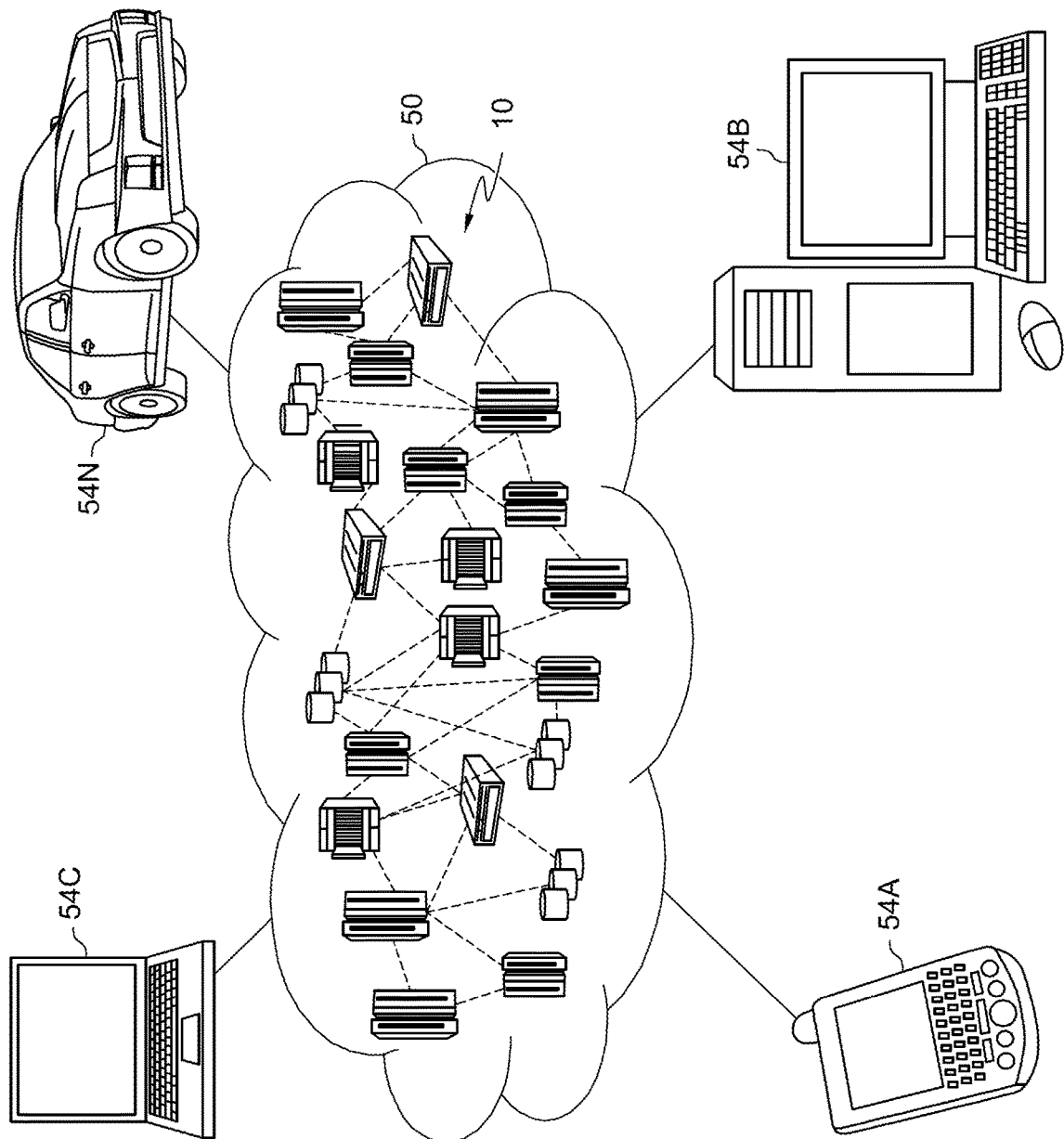
FIG. 4 depicts a cloud computing environment according to an exemplary embodiment.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
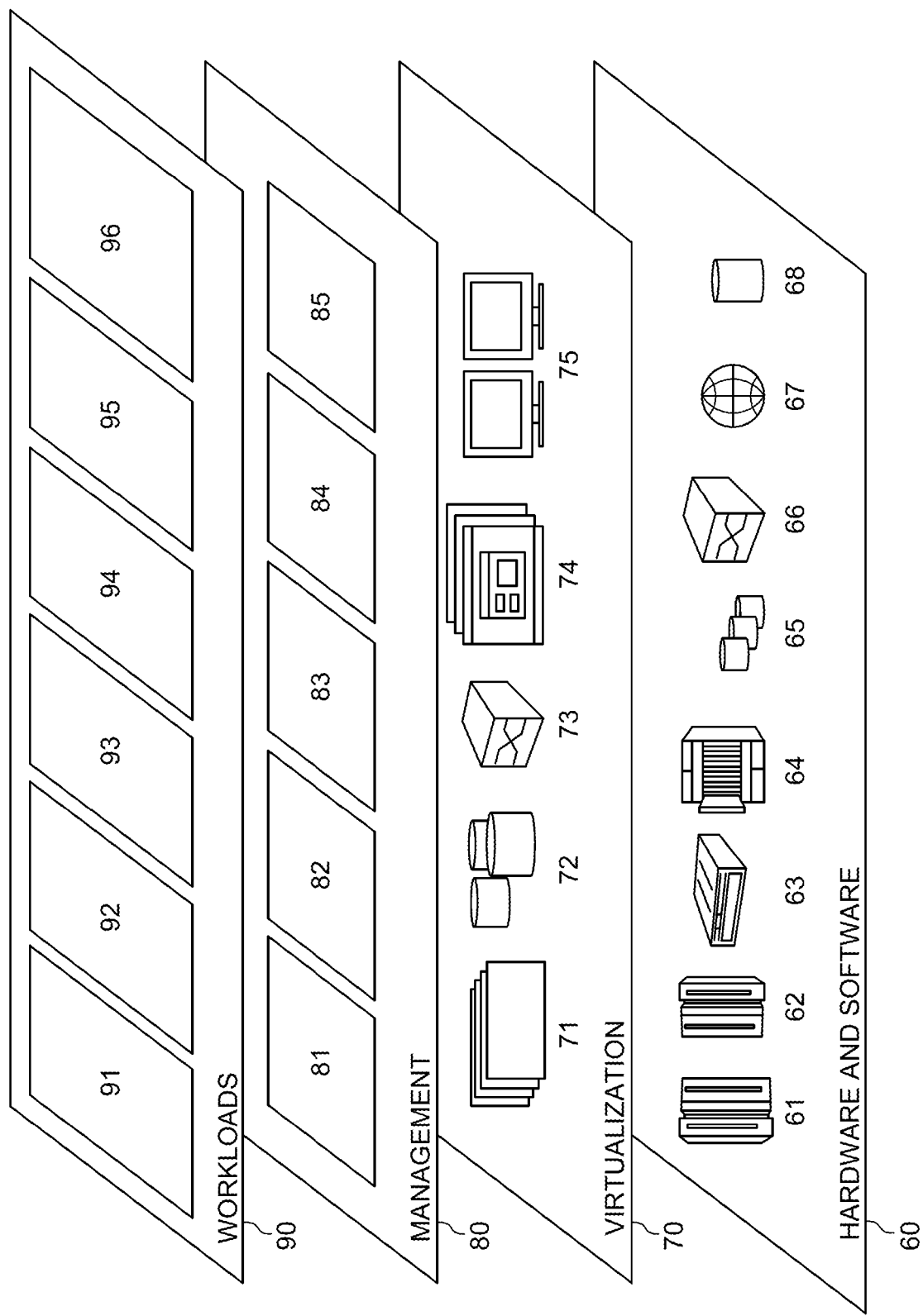
FIG. 5 depicts abstraction model layers according to an exemplary embodiment.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and bridging live blog platforms with virtual collaboration sessions 96. Bridging live blog platforms with virtual collaboration sessions may describe connecting to a virtual collaboration session and providing the contents to a live blog platform while making decisions to reduce bandwidth demands on the users of the live blog platform.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for reducing bandwidth requirements of a virtual collaboration session, the method comprising:
   connecting to both the virtual collaboration session as a participant and a live blog platform, wherein the virtual collaboration session also includes a host computing device;
   capturing session data from the virtual collaboration session, wherein the session data is selected from a group consisting of: video data, audio data, text data and a screen image of the host computing device;
   generating a text transcription of the virtual collaboration session from the audio data and transmitting the text transcription of the virtual collaboration session to the live blog platform;
   identifying an important topic in the virtual collaboration session based on the session data, wherein the important topic in the virtual collaboration session indicates a requirement for related session data in addition to the text transcription; and
   generating a multimedia file by extracting the related session data from the session data and transmitting the multimedia file to the live blog platform.

2. The computer-implemented method of claim 1, further comprising, in response to receiving text messages from the live blog platform, transmitting the text messages to the virtual collaboration session.

3. The computer-implemented method of claim 1, wherein the identifying the important topic further comprises:
   identifying specific phrases in the text transcription being transmitted to the live blog platform using a natural language processing algorithm; and
   identifying the important topic based on the specific phrases.

4. The computer-implemented method of claim 1, wherein the identifying the important topic further comprises:
   extracting a video frame from the session data;
   identifying specific objects in the video frame using an object recognition algorithm; and
   identifying the important topic based on the specific objects.

5. The computer-implemented method of claim 1, wherein the transmitting the multimedia file to the live blog platform further comprises:
   determining a connection speed from the virtual collaboration session to the live blog platform; and
   in response to the connection speed being above a threshold, transmitting the multimedia file.

6. The computer-implemented method of claim 1, wherein the transmitting the multimedia file to the live blog platform further comprises:
   determining a difference between the multimedia file and a prior multimedia file by comparing video frames from the multimedia file to prior video frames from the prior multimedia file; and
   in response to the difference being above a threshold, transmitting the multimedia file to the live blog platform.

7. The computer-implemented method of claim 1, wherein the generating the text transcription of the virtual collaboration session further comprises:
   identifying a plurality of utterances in the audio data of the virtual collaboration session and a speaker for each utterance;
   associating the speaker for an utterance with the utterance; and
   removing the utterance from the text transcription of the virtual collaboration session based on the speaker.

8. A computer system for reducing bandwidth requirements of a virtual collaboration session, the system comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
   connecting to both the virtual collaboration session as a participant and a live blog platform, wherein the virtual collaboration session also includes a host computing device:
   capturing session data from the virtual collaboration session, wherein the session data is selected from a group consisting of: video data, audio data, text data and a screen image of the host computing device;
   generating a text transcription of the virtual collaboration session from the audio data and transmitting the text transcription of the virtual collaboration session to the live blog platform;
   identifying an important topic in the virtual collaboration session based on the session data, wherein the important topic in the virtual collaboration session indicates a requirement for related session data in addition to the text transcription; and
   generating a multimedia file by extracting the related session data from the session data and transmitting the multimedia file to the live blog platform.

9. The computer system of claim 8, further comprising, in response to receiving text messages from the live blog platform, transmitting the text messages to the virtual collaboration session.

10. The computer system of claim 8, wherein the identifying the important topic further comprises:
    identifying specific phrases in the text transcription being transmitted to the live blog platform using a natural language processing algorithm; and
    identifying the important topic based on the specific phrases.

11. The computer system of claim 8, wherein the identifying the important topic further comprises:
    extracting a video frame from the session data;
    identifying specific objects in the video frame using an object recognition algorithm; and
    identifying the important topic based on the specific objects.

12. The computer system of claim 8, wherein the transmitting the multimedia file to the live blog platform further comprises:
    determining a connection speed from the virtual collaboration session to the live blog platform; and
    in response to the connection speed being above a threshold, transmitting the multimedia file.

13. The computer system of claim 8, wherein the transmitting the multimedia file to the live blog platform further comprises:
    determining a difference between the multimedia file and a prior multimedia file by comparing video frames from the multimedia file to prior video frames from the prior multimedia file; and
    in response to the difference being above a threshold, transmitting the multimedia file to the live blog platform.

14. The computer system of claim 8, wherein the generating the text transcription of the virtual collaboration session further comprises:
    identifying a plurality of utterances in the audio data of the virtual collaboration session and a speaker for each utterance;
    associating the speaker for an utterance with the utterance; and
    removing the utterance from the text transcription of the virtual collaboration session based on the speaker.

15. A computer program product for reducing bandwidth requirements of a virtual collaboration session, the computer program product comprising:
    a computer readable storage medium having program instructions embodied therewith, the program instructions executable by a processor to cause the processor to perform a method comprising:
        connecting to both the virtual collaboration session as a participant and a live blog platform, wherein the virtual collaboration session also includes a host computing device:
        capturing session data from the virtual collaboration session, wherein the session data is selected from a group consisting of: video data, audio data, text data and a screen image of the host computing device;
        generating a text transcription of the virtual collaboration session from the audio data and transmitting the text transcription of the virtual collaboration session to the live blog platform;
        identifying an important topic in the virtual collaboration session based on the session data, wherein the important topic in the virtual collaboration session indicates a requirement for related session data in addition to the text transcription; and
        generating a multimedia file by extracting the related session data from the session data and transmitting the multimedia file to the live blog platform.

16. The computer program product of claim 15, wherein the identifying the important topic further comprises:
    identifying specific phrases in the text transcription being transmitted to the live blog platform using a natural language processing algorithm; and
    identifying the important topic based on the specific phrases.

17. The computer program product of claim 15, wherein the identifying the important topic further comprises:
    extracting a video frame from the session data;
    identifying specific objects in the video frame using an object recognition algorithm; and
    identifying the important topic based on the specific objects.

18. The computer program product of claim 15, wherein the transmitting the multimedia file to the live blog platform further comprises:
    determining a connection speed from the virtual collaboration session to the live blog platform; and
    in response to the connection speed being above a threshold, transmitting the multimedia file.

19. The computer program product of claim 15, wherein the transmitting the multimedia file to the live blog platform further comprises:
    determining a difference between the multimedia file and a prior multimedia file by comparing video frames from the multimedia file to prior video frames from the prior multimedia file; and
    in response to the difference being above a threshold, transmitting the multimedia file to the live blog platform.

20. The computer program product of claim 15, wherein the generating the text transcription of the virtual collaboration session further comprises:
    identifying a plurality of utterances in the audio data of the virtual collaboration session and a speaker for each utterance;
    associating the speaker for an utterance with the utterance; and
    removing the utterance from the text transcription of the virtual collaboration session based on the speaker.

* * * * *